I. D. ALBIN, Sr.
HORSE-POWERS.
No. 195,244. Patented Sept. 18, 1877.
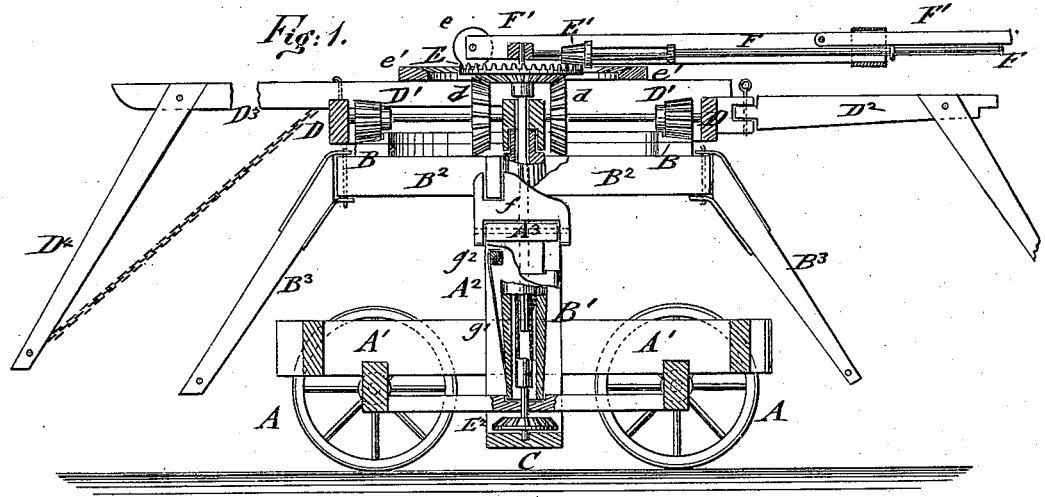
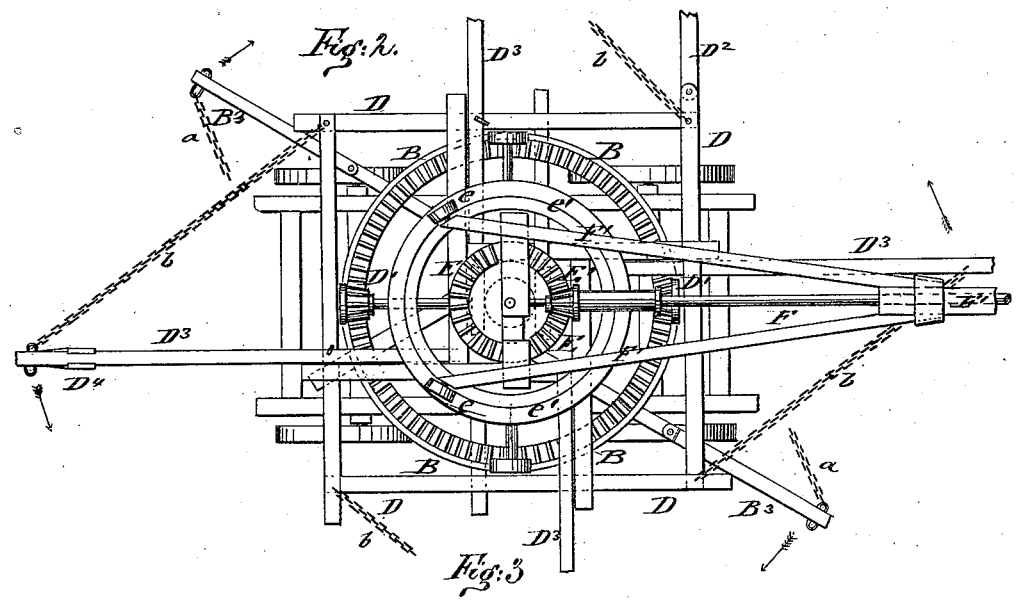
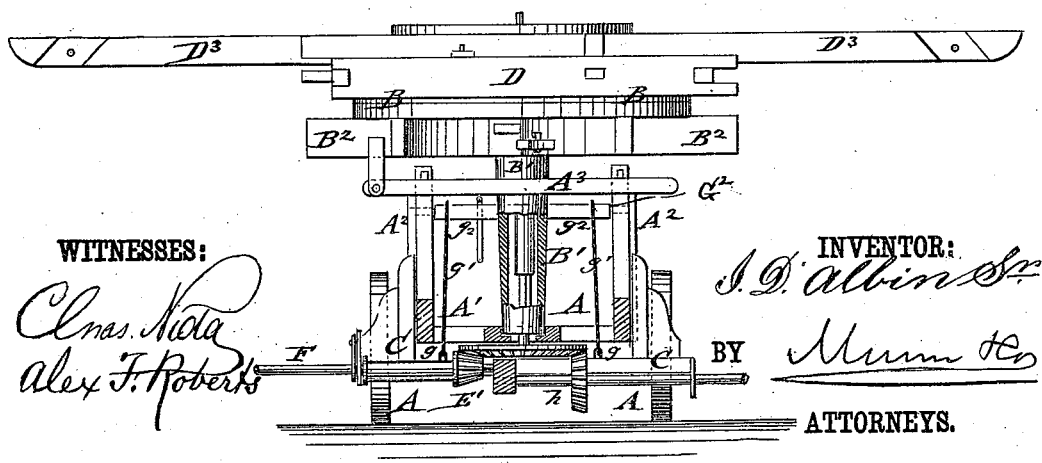
WITNESSES:
Chas. Nida
Alex. T. Roberts
INVENTOR:
I. D. Albin Sr.
BY Munn & Co.
ATTORNEYS.

UNITED STATES PATENT OFFICE.

ISAAC D. ALBIN, SR., OF CHILHOWEE, MISSOURI.

IMPROVEMENT IN HORSE-POWERS.

Specification forming part of Letters Patent No. 195,244, dated September 18, 1877; application filed August 11, 1877.

*To all whom it may concern:*

Be it known that I, ISAAC D. ALBIN, Sr., of Chilhowee, in the county of Johnson and State of Missouri, have invented a new and Improved Horse-Power, of which the following is a specification:

In the accompanying drawing, Figure 1 represents a sectional side elevation of my improved horse-power, showing the same arranged with the transmitting line-shaft in elevated position; Fig. 2, a top view of the same, and Fig. 3 a sectional side elevation with transmitting line-shaft in position near the ground.

Similar letters of reference indicate corresponding parts.

The object of this invention is to furnish an improved portable horse-power for thrashers, separators, and other agricultural machinery, the power having the advantage of being run with double reversible draft and any desired number of horses, from two to fourteen, according to the machinery to be driven.

The horse-power may also be as a single power, and the transmitting-shafting be arranged in elevated position above the horses, or in a position near the ground, as desired.

The double reversible draft-frames of the power produce the balancing of the apparatus so as to dispense with the staking or chaining down of the same, and admit, therefore, a lighter construction and its mounting on a wide truck or common farm-wagon, all of which serve to render this horse-power of great advantage for the various applications.

The invention consists of a master-wheel and frame, having a number of draft-levers that are drawn in one direction, and of a pinion-frame, with levers that are drawn in opposite directions, the draft-levers of the pinion-frame being elevated to admit the horses of the master-wheel to pass under them, inside of the track of the horses attached to the pinion-frame. The pinion-frame transmits the power by suitable gearing to a crown-wheel, and, by an intermeshing speed-pinion, to the driving line-shaft, that is supported in a triangular top-frame.

The driving line-shaft may also be arranged at the base of the power, near the ground, by reversing the crown-wheel and placing it at the base of the shaft of the master-wheel, and inserting the speed-pinion and line-shaft into a vertically-adjustable bottom frame, sliding along guide-standards of the base-frame. The master-wheel shaft is hollow, to admit the rotation of the coupled crown-wheel shaft in its top or bottom position.

Referring to the drawing, A represents a supporting truck or wagon to which the base-frame $A^1$ of my improved horse-power is rigidly applied. The tubular shaft $B^1$ of the master-wheel B turns by its lower end in the truck-frame, and the interior crown-wheel shaft on a step of a vertically-adjustable frame, C, that extends laterally below the base-frame $A^1$, and is guided along rails of the side standards $A^2$ of the base-frame, the standards being laterally connected by a cap brace-piece, $A^3$, which forms the upper bearing for the master-wheel shaft.

The master-wheel frame $B^2$ is provided with as many hinged and downwardly-inclined draft-levers $B^3$ as there are arms extending beyond the master-wheel, six being shown in the drawing.

The draft-levers are braced by chains or rods $a$ that extend from the outer ends of the draft-levers back to the next adjoining arms of the master-wheel frame, the horses being attached to the front hooks of the levers and made to traverse in a circle close to the supporting-truck.

The pinion-frame D revolves on the top of the master-wheel, and is retained and guided by a hollow journal or sleeve, bolted around the center part of the master-wheel frame and extended vertically in line with the hollow shaft $B^1$ of the master-wheel.

The pinion-frame D has a square center-piece of timber sufficiently large to admit of a hole to receive the hollow journal of the master-wheel, so as to turn thereon. The center-piece supports the inner bearing of the pinion-shaft, and also the adjustable bearing of the crown-wheel shaft. The pinion-frame D is made of square shape, with pinion-shafts in one direction and guide-wheel shafts at right angles thereto, the pinions $D^1$ meshing with the cogs of the master-wheel, and the guide-wheels traveling on the interior raised circumference of the master-wheel.

The square pinion-frame D is provided at the corners with the hinged lever-arms D², that may be securely locked in the direction of the side pieces of the frame, to which they are respectively applied.

Intermediately between the lever-arms, extending from the corners, are detachable arms D³, which are secured by the inner ends into mortises of the central part of the pinion-frame, retained by clasp-bolts at the outer part of the frame, and stiffened by brace-rods or chains $b$, running back from their outer ends to the pinion-frame.

In this manner eight rigid lever-arms are furnished, to which inclined and downwardly-extending arms D⁴ are bolted, to each of which a horse may be applied.

The horses of the pinion-frame traverse in a circle of larger diameter around the horses of the master-wheel, but in opposite direction to the same, the lever-arms of the pinion-frame being arranged at such elevation that the horses of the master-wheel can readily pass below the same.

The speed of the power is considerably increased by the reversed motion of the master-wheel and pinion-frames, and by the double draft exerted thereon, the entire apparatus being balanced in such a manner that no staking down or chaining in position of the same is required, and also the power started and stopped at any moment and with great facility.

The horses have no chance to shirk their duty as they are carried along, for if they stand still they have to hold the power, so that virtually one set of horses is a check on the other set.

The pinion-shafts transmit the power by bevel-wheels $d$ to the bottom gearing of a double crown-wheel, E, whose upper gearing meshes with the speed-pinion E¹ of the driving line-shaft F, which turns in suitable bearings of a sectional folding top frame, F′, of triangular shape, that rests by balancing travelers $e$ at right angles to a circular guideway, $e'$, of the pinion-frame.

The inner end of the driving line-shaft turns in a lateral cross-piece of the top frame F′, which is placed on the projecting end of the crown-wheel shaft. The top frame F′ is retained on the pinion-frame by the shaft ends of the balancing travelers projecting into a circular groove of the track, or in other suitable manner, to prevent the speed-pinions from rising out of gear.

The shaft-supporting frame is extended to the separator or other machine to be driven by the power, and propped at points outside of the track of the horses in suitable manner.

The shaft of the speed-pinion E¹ is so coupled as to be detachable from the folding frame, the remaining shaft-sections being coupled in suitable manner, as well as the frame-sections when required for use.

The power may be run with the full complement of horses, or one-half of the apparatus may only be run, by locking the frame of the master-wheel to a hinged and recessed stay, $f$, of the top piece A³ of the base-frame, so so that in this manner the power may be run with a less number of horses, in the manner of the common horse-powers.

The transmitting line-shaft may also, if desired, be arranged near the ground, according to the machines to be driven. In this case the coupled shaft of the crown-wheel E is detached, and the crown-wheel brought down to the adjustable frame C, which is first lowered by detaching it from the hooks $g$ of the hoisting-cords $g^1$.

A bevel-wheel, E², at the lower end of the crown-wheel shaft, changes place with the crown-wheel and meshes there with the bevel-wheels of the pinion-shafts. The speed-pinion is then placed in position on bearings of the lateral frame C, and the latter hoisted by means of a windlass, G², and the hoisting-cords $g^2$, so that the crown-wheel and speed-pinion intermesh with each other.

The inverted crown-wheel E also gears with a second bevel-pinion and shaft, $h$, that extends at the opposite side of the frame C, for the purpose of running two different machines at different speeds.

The shafts are extended by coupling the sections together beyond the track of the horses, the horses stepping over the shafts as they pass the same.

Owing to the double-draft motion and balancing of the master-wheel and pinion-frame, the power may be built of lighter timber, and the horses driven at less speed, as considerable speed is gained by the working of the frames in opposite direction.

The power may be run with equal facility by any number of horses, according to the horse-powers required by the machinery to be operated thereby.

After use the draft-levers and driving-shafts are detached and stored on the truck, so that the horse-power may be transported in compact state from place to place.

Having thus described my invention, I claim as new and desire to secure by Letters Patent—

1. In a horse-power, the revolving master-wheel and frame, in combination with a pinion-frame revolving in opposite direction to the master-wheel, to obtain increased speed of driving-shaft, substantially as and for the purpose set forth.

2. The combination of the revolving master-wheel and frame, having detachable and inclined draft-levers, and the pinion-frame, having detachable arms and draft-levers, and revolving in opposite direction to the master-wheel, with a transmitting double crown-wheel and driving-shaft supported on top of pinion-frame, substantially as specified.

3. The combination of the revolving pinion-frame and double crown-wheel with the detachable speed-pinion, driving-shaft, and sectional supporting-frame, resting by end travelers on a guideway of the pinion-frame, substantially as and for the purpose described.

4. The combination of the supporting-standard and top piece, having hinged and recessed lock-piece, with the master-wheel frame, to lock the same in fixed position, as described.

5. The combination of the master-wheel, tubular master-wheel shaft, pinion-frame, and inverted crown-wheel with the speed-pinion and driving shaft or shafts, supported in the vertically-adjustable bottom frame of the apparatus, to transmit power near the ground, substantially as set forth.

6. The combination of the tubular master-wheel shaft, turning in bearings of the supporting-frame, with the independently revolving and coupled crown-wheel shaft, turning in bearings of the adjustable bottom frame, and of the pinion-frame, substantially as specified.

ISAAC D. ALBIN, Sr.

Witnesses:
JOHN HERRING,
JOHN M. FULTON.